(12) United States Patent
Goisser et al.

(10) Patent No.: US 12,201,487 B2
(45) Date of Patent: Jan. 21, 2025

(54) REVERSE-FLOW BRAKE FOR ROTORS IN DENTAL PREPARATION INSTRUMENTS

(71) Applicant: DENTSPLY SIRONA INC., York, PA (US)

(72) Inventors: Siegfried Goisser, Einhausen (DE); Stefan Göbel, Langen (DE); Metin Ertugrul, Darmstadt (DE)

(73) Assignee: Dentsply Sirona Inc., York, PA (US)

( * ) Notice: Subject to any disclaimer, the term of this patent is extended or adjusted under 35 U.S.C. 154(b) by 741 days.

(21) Appl. No.: 17/297,511

(22) PCT Filed: Nov. 27, 2019

(86) PCT No.: PCT/EP2019/082700
§ 371 (c)(1),
(2) Date: May 27, 2021

(87) PCT Pub. No.: WO2020/109368
PCT Pub. Date: Jun. 4, 2020

(65) Prior Publication Data
US 2022/0008162 A1    Jan. 13, 2022

(30) Foreign Application Priority Data
Nov. 27, 2018    (EP) .................................. 18208524

(51) Int. Cl.
*A61C 1/05*        (2006.01)
(52) U.S. Cl.
CPC ..................... *A61C 1/05* (2013.01)
(58) Field of Classification Search
CPC ........... A61C 1/05; A61C 1/057; A61C 1/052; A61C 1/12; A61C 1/185; A61C 3/06;
(Continued)

(56) References Cited

U.S. PATENT DOCUMENTS

| | | | | | |
|---|---|---|---|---|---|
| 5,562,446 A | * | 10/1996 | Matsui | ..................... | A61C 1/05 433/132 |
| 5,567,154 A | * | 10/1996 | Wohlgemuth | ........... | A61C 1/05 433/132 |

(Continued)

FOREIGN PATENT DOCUMENTS

| | | |
|---|---|---|
| DE | 929668 C | 6/1955 |
| DE | 102012212483 A1 | 1/2014 |

OTHER PUBLICATIONS

International Search Report; PCT/EP2019/082700; Jan. 24, 2020 (completed); Feb. 4, 2020 (mailed).

(Continued)

*Primary Examiner* — Heidi M Eide
*Assistant Examiner* — Shannel Nicole Belk
(74) *Attorney, Agent, or Firm* — SCHWEGMAN LUNDBERG & WOESSNER, P.A.

(57) ABSTRACT

The invention relates to a rotor (1) having a turbine wheel (3) driven by propellant (TG) in a turbine housing (2), a dental preparation instrument (20) having such a rotor (1) and a method (100) for operating such a preparation instrument (20), wherein at least one part of the propellant (TG) flows back to the gas outlet opening (51) in an inner wall (21) radially orbiting the turbine wheel (3) through a return flow channel (6) after impinging on at least one of the drive blades (31) of the turbine wheel (3) counter to the direction of rotation (DR) of the turbine wheel (3), the inner wall (21) in the segment of a circle (KS) comprises at least one return flow channel (6) extending at least from the gas inlet opening (41) as far as the gas outlet opening (51), which allows at least one part of the propellant (TG) to flow back to the gas outlet opening (51) through the return flow channel (6) after impinging on at least one of the drive blades (31) counter to the direction of rotation (DR) of the turbine wheel (3), wherein, in axial direction (AR), the (Continued)

Figure 1A:
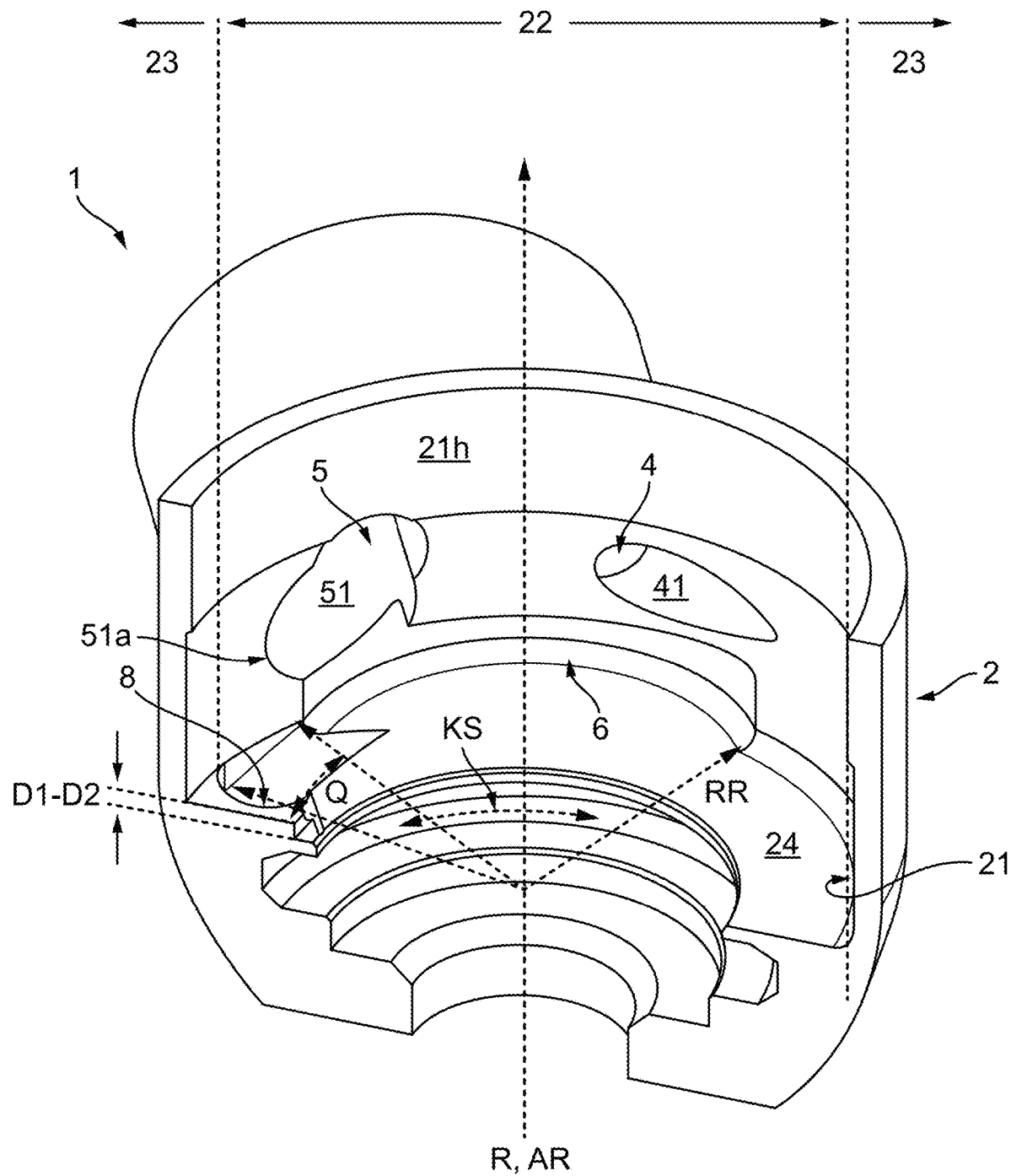

turbine housing (2) has at least one cross-sectional extension (8) of a surface between drive blades (31) and inner wall (21) as far as the return flow channel (6).

15 Claims, 6 Drawing Sheets

(58) Field of Classification Search
CPC . A61B 2017/00535; A61B 2017/00544; Y10S 415/903; H02K 5/15–1737; H02K 5/24; H02K 5/08; H02K 5/09; B23B 31/1292; B23B 31/103
USPC ......... 433/133; 415/1, 904; 310/90; 279/106
See application file for complete search history.

(56) References Cited

U.S. PATENT DOCUMENTS

| | | | | |
|---|---|---|---|---|
| 6,120,291 | A * | 9/2000 | Bareth | A61C 1/05 433/132 |
| 2014/0212271 | A1* | 7/2014 | Lai | F01D 5/02 415/116 |
| 2015/0164613 | A1* | 6/2015 | Rein | A61C 1/05 433/132 |

OTHER PUBLICATIONS

International Preliminary Report on Patentability; PCT/EP2019/082700; Jan. 24, 2020 (completed); Feb. 4, 2020 (mailed).
Written Opinion of the International Searching Authority; PCT/EP2019/082700; Jan. 24, 2020 (completed); Feb. 4, 2020 (mailed).

* cited by examiner

REVERSE-FLOW BRAKE FOR ROTORS IN DENTAL PREPARATION INSTRUMENTS

FIELD OF THE INVENTION

The invention relates to a rotor, a dental preparation instrument having such a rotor, and a method for operating such a dental preparation instrument.

BACKGROUND OF THE INVENTION

In known dental preparation instruments having a turbine drive, also called dental turbines, pressurised air is used to drive a rotor (turbine wheel plus surroundings). The kinetic energy of the air causes a force impact on the blades of the rotor by momentum exchange. A torque is formed at the rotor from this force impact, and the rotational speed being set is in the first instance dependent on the speed of the air coming out of the nozzle when running idle. The idling rotational speed, thus the operation of the rotors when not loaded, the torque and therefore the usable power is zero, while the maximum power is set characteristically at half the idling rotational speed. Increasing the idling rotational speed to increase the maximum power however has a disadvantageous effect on the lifespan of the mounting and the noise behaviour of dental turbines. Therefore, it is attempted to influence the rotational speed of the rotors, such as for example described in printed publication DE 10 2012 212 483 A1, by means of a taller turbine housing.

Printed publication DE 43 20 532 C1 discloses a dental turbine in which an adjuster is arranged to regulate the turbine rotational speed in the flow path of the outlet air between wheel and wheel housing on the rotating part thereof, which adjuster changes its shape and/or position, during rotation, as a consequence of centrifugal force such that the effective cross-section decreases as rotational speed increases, and increases as rotational speed decreases. The adjuster can be a pot-shaped spring disk which is arranged with its angle-forming edge facing the wheel in the recess thereof. However, this solution requires additional components to regulate the turbine rotational speed, complicating the configuration of the dental turbines and representing increased production cost. Additional components such as here the adjuster also make the dental turbines less robust and impede the simplest, most compact, design.

US2015164613A1 discloses dentists' preparation instrument.

DE929668C discloses a Device for limiting the maximum speed of turbines, especially for grinding machines.

It would be desirable to have available a noise-reduced dental preparation instrument with a long lifespan which possesses an uncomplicated configuration, is robust and can be produced, with low production cost, in a compact design.

SUMMARY OF THE INVENTION

It is therefore an object of the invention to have available a noise-reduced dental preparation instrument with a long lifespan, which also has an uncomplicated configuration, is robust and can be produced, with low production cost, in a compact design.

This has object has been achieved by the rotor as defined in claim 1, the dental preparation instrument as defined in claim 14, and the method as defined in claim 15.

The present invention provides a rotor for driving an implement of a dental preparation instrument, having a turbine wheel mounted in a turbine housing, which turbine wheel has a plurality of drive blades,
wherein the turbine housing is formed from an inner wall radially orbiting the turbine wheel, and cover surfaces enclosing the inner wall above and below,
at least one gas inlet channel with a gas inlet opening for admitting a propellant into the turbine housing for driving the turbine wheel and
at least one gas outlet channel with a gas outlet opening for leading the propellant away from the turbine housing once the turbine wheel has been driven,
wherein gas inlet opening and gas outlet opening are arranged in the inner wall within a segment of a circle of a maximum of 1800,
wherein the inner wall in the segment of a circle comprises at least one return flow channel extending at least partially from the gas inlet opening as far as the gas outlet opening,
wherein the return flow channel allows at least one part of the propellant to flow back to
the gas outlet opening through the return flow channel after impinging on at least one of
the drive blades counter to the direction of rotation of the turbine wheel, and wherein, in the axial direction, the turbine housing has at least one cross-sectional extension between drive blades and the cover surfaces, which is formed by a recess in one of the cover surfaces having a first distance in axial direction between drive blades and the cover surface, which extends at least over the region of the return flow channel viewed in the direction of the propellant flowing in the return flow channel at least as far as the outer end of the gas outlet opening in direction of the returning propellant, and having at least one second distance in axial direction between drive blades and the cover surface in the other region, wherein the second distance is shorter than the first distance.

The turbine housing is formed by two cover surfaces, between which the turbine wheel rotates, and by an inner wall radially orbiting the turbine wheel, which as a rule is cylindrical. An upper cover surface can also be called a cover and a lower cover surface can also be called a base. In the present invention, rather than the cover surfaces of the turbine housing, the part of the inner wall between the cover surfaces which in the dental preparation instrument is remote from the hand part of the dental preparation instrument is denoted as the end face of the turbine housing. Correspondingly, the side of the inner wall opposite the end face of the turbine housing is denoted as the side facing the hand part or as the hand side. The surface between the drive blades and the inner wall is the cross-sectional surface in radial direction of the space between the drive blades and the inner wall.

In the present invention, the term "radially" denotes a direction from a centre of a circle outwards, whereas the term "radially orbiting" denotes a circular orbit around a component. In contrast, the direction parallel to the axis of rotation of the turbine wheel is denoted as the axial direction.

The outer end of the gas outlet opening is the rear end of the gas outlet opening, viewed in the direction of the returning gas. Nevertheless, in so doing, the cross-sectional extension extends between drive blades and inner wall. The related cross-sectional surface which is enlarged in axial direction thus lies in radial direction between the drive blades of the turbine wheel and the inner wall. The cross-sectional extension, in contrast, does not denote a possible channel in a retaining ring in axial direction above or below the drive blades between the cover surfaces of the turbine housing and the drive blades of the turbine wheel.

The cross-sectional extension (step in the cover surface) is thus arranged either directly at the gas outlet opening or at an angle of a few degrees, preferably less than 5°, stretched between cross-sectional opening, axis of rotation of the turbine wheel and outer end of the gas outlet opening. With this close arrangement of the cross-sectional extension in the gas outlet opening, the eddy generated by the cross-sectional extension lies directly against or at the gas outlet opening.

The cross-sectional extension (extension of the cross-sectional surface) in axial direction between drive blades and orbiting inner wall in the region of the gas outlet opening, in direction of rotation of the turbine wheel in front of the gas outlet opening, leads to a swirling of the propellant carried with the turbine wheel at the point where the distance from the cover surface to the turbine wheel increases from the second to the first distance. On the one hand, this substantially stationary eddy which is formed there draws the propellant recoiling from the drive blades and strengthens the reverse flow of the propellant through the return flow channel, and moreover directs at least one part of the propellant flowing back through the return flow channel to the gas outlet opening against the side of the drive blades which is directed in direction of rotation, and thus slows down the turbine wheel due to the impingement. This effect is reinforced as the rotational speed of the turbine wheel increases, as the speed difference between the returning gas impinging on the drive blade and the speed of the drive blade increases with the rotational speed of the turbine wheel, whereby the rotational speed-dependent braking effect produced as a result increases markedly with the rotational speed. As the maximum power of a rotor of a dental preparation instrument is achieved at half the idling rotational speed, the power loss at these relatively low rotational speeds is fairly low, whereas at high rotational speeds the braking effect leads to a desired clear power loss, which improves the noise behaviour of the dental preparation instrument and is favourable for the lifespan of the mounting of the turbine wheel. The propellant can for example be compressed air. As the cross-sectional extension can be arranged in the vicinity or directly at the gas outlet opening, after impingement on the opposite front side of the drive blade has taken place, the part of the propellant used for braking can leak out of the turbine housing directly through the gas outlet opening, without the braking power and thus the braking force being reduced. Thereby, the gas paths in the turbine housing are kept to a minimum, and the turbine housing is correspondingly designed more compact. In one embodiment, the return flow channel extends in the inner wall of the gas inlet opening as far as the gas outlet opening.

In so doing, the adjacently arranged gas inlet and gas outlet openings are not arranged directly abutting one another, instead there is a region of the orbiting inner wall between the gas inlet and gas outlet openings, wherein the region of the inner wall does not possess any great expansion in the direction orbiting the turbine wheel such that gas inlet and gas outlet openings are, indeed, located on the hand side of the inner wall. All regions of the inner wall facing the later hand part in the dental preparation instrument are denoted by the same side, whereby the angle between gas inlet opening and gas outlet opening, stretched over the axis of rotation of the rotor, is less than 180°. In a further embodiment, the segment of a circle with gas inlet and gas outlet openings is arrangeable on one hand side of the dental preparation instrument.

The advantages of the rotor according to the invention are the reduction in idling rotational speed without reducing the maximum torque or maximum power to any relevant extent, whereby the mountings used are both low-maintenance and low-wear. Moreover, the achievement according to the invention does not require any additional installation space in the rotor or in the dental preparation instrument, or any additional components. As a result, the turbine housing can be designed more compact, at least in axial direction, and is easier to produce for manufacturing reasons due merely to the return flow channel being added. Moreover, it is not necessary to change rotors known to the turbine wheel or the drive blade in order to achieve the desired effect here with the design according to the invention of the turbine housing.

In combination with the return flow channel, the above advantages are achieved by the cross-sectional extension of a surface between drive blades and inner wall as far as the return flow channel using the distance between turbine wheel and cover surface which increases from the second to the first distance, whereby, in a targeted manner, an eddy is generated at the turbine wheel, through which eddy the propellant which flows through the return channel counter to the direction of rotation of the turbine wheel, and in a targeted manner is deflected against the drive blades of the turbine wheel, with the result that this is slowed down. In so doing, the braking effect is markedly dependent on rotational speed and barely influences the maximum power, as this is achieved at half the idling rotational speed. The diameter of the rotor can be further reduced as a result.

The rotor according to the invention thus makes possible a dental preparation instrument with a long lifespan, which also possesses an uncomplicated configuration, is robust and can be produced with low production cost in a compact design.

In one embodiment, the return flow channel orbits the turbine wheel at the same axial height relative to the axis of rotation of the turbine wheel. A continuous return flow channel from the gas inlet opening as far as the gas outlet opening is provided as a result, which does not especially limit the geometric free space for arranging the gas inlet and gas outlet opening. The returning propellant thus reaches the eddy over the shortest path and thus the accommodating drive blades for the desired braking effect. For example, the bottom side of the return flow channel is provided by the bottom surface or the top side of the return flow channel is provided by the cover surface of the turbine housing.

In a further embodiment, the gas inlet opening and/or the gas outlet opening are arranged, relative to the return flow channel, above or below one another, viewed in direction of the axis of rotation of the turbine wheel. Here, the gas inlet opening and/or the gas outlet opening can be arranged above the return flow channel or the return flow channel can be arranged above the gas inlet opening and/or the gas outlet opening. Because the gas inlet and/or gas outlet openings are arranged offset to the return flow channel, the return flow channel can be admitted into the inner wall of the turbine housing, and thus does not disrupt the gas inlet and/or gasoutlet.

Moreover, the return flow channel can thus be provided with a large flow cross-section. Depending on whether the return flow channel is arranged above or below the gas inlet and gas outlet openings, the returning propellant impinges on the upper or lower region (side) of the drive blades.

In one embodiment, the return flow channel is guided in the orbiting inner wall of the turbine housing with a cross-sectional surface parallel to the radial direction of the turbine wheel such that at least the centre (geometric focal point of the surface) of the cross-sectional surface lies further away from the turbine wheel in radial direction than the gas inlet opening and/or the gas outlet opening, preferably the whole return flow channel is further away from the turbine wheel in radial direction than the gas inlet opening and/or the gas outlet opening. As a result, the turbine housing can also be designed even more compact, in radial direction, and is even easier to produce in terms of manufacturing. In one embodiment, the cross-sectional extension extends as far as below the turbine wheel.

In a further embodiment, the gas inlet and gas outlet openings each have centres (geometric focal points) which are arranged at the same axial height relative to the axis of rotation of the turbine wheel. In this geometry, the return flow channel can be designed with the greatest geometric degrees of freedom.

In a further embodiment, the gas outlet opening and return flow channel are aligned towards one another such and a contour of the drive blades is formed such that the propellant is deflected in its propagation direction by 900 to 175°, preferably by 1200 to 170°, even more preferably by 150° to 165°, by the impingement on the drive blades. The power transmission from propellant to the drive blades is at its greatest at greater angles, wherein the ideal angle for this, 180°, would however lead to the returning propellant disrupting the gas flow of the propellant flowing back to the drive blade, which would have a negative effect on driving the turbine wheel. A deflection of the gas flow by an angle of less than 1800 is advantageous in this respect. The smaller the angle, the less disruption there is on the two gas flows. However, the power transmission on the drive blade decreases as the angle is reduced, with the result that rotors at a deflection angle of less than 900 cannot be driven optimally.

In a further embodiment, the cover surface passes from the first distance to the second distance to the turbine wheel in a curved contour. A curved contour denotes a three-dimensionally designed contour which does not have any sharp edges. The curved contour makes it possible for the returning propellant to be deflected to the eddy in a targeted manner, in order to be deflected by this increasingly (or decreasingly if the arrangement of the components is reversed) in the direction of the drive blades. For example, an edge at right angles would on the contrary lead to at least one part of the propellant striking this wall rising from the cover surface and not the drive blades and therefore one part of the return flow cannot be used as desired for generating braking force.

In a further embodiment, the gas inlet channel is shaped as a nozzle at least in the region of the gas inlet opening, in order to deflect the propellant onto the drive blades in directed manner. Due to the nozzle shape, the deflection angle between the propellant flowing towards the drive blade and the propellant flowing back after impinging on the drive blade can be set precisely, with the result that both gas flows cause the least possible disruption. Preferably, in so doing, the nozzle forces a flow of propellant, the projection of which on the axis of rotation is angled at an angle unequal to 90°, preferably this angle is less than 80° or greater than 100°, to the axis of rotation, in order that the two gas flows (propellant which flows to the drive blade which flows away from this after impinging on the drive blade) are well separated from one another.

The contour of the drive blades of the turbine wheel can have a free form, wherein the contour of the front and rear side of the drive blades can further differ in radial direction or can be the same. In radial direction further inwards, the contours between front and rear side may likewise differ from one another in some embodiment examples. For example, viewed in radial direction, drive blades can have an asymmetrical contour, a v-shaped contour or a wavy contour, at least on the front side viewed in direction of rotation, wherein the side of the drive blades point rearwards in direction of rotation of the turbine wheel. The design of the contour of the side makes it possible to achieve a defined and optimisable braking effect due to the impingement of the returning propellant on the front side of the drive blade (viewed in direction of rotation). In another embodiment, the turbine wheel can itself likewise have a cover surface and/or a bottom surface. However, these cover surfaces and bottom surfaces should not be confused with the cover surfaces of the turbine housing, but instead constitute an additional design. The cover surface and/or the bottom surface of the turbine wheel can partially comprise recesses or the drive blades are partially excluded from the ceiling and/or bottom surface.

In a further embodiment, the ratio between first and second distance forces an eddy which redirects the propellant returning through the return flow channel against the region of the drive blade facing the eddy (W). The gas flow is thereby designed such that a maximum braking effect is achievable.

In a further embodiment, the region of the drive blade facing the eddy has an alignment which causes the returning propellant to strike the region at an angle of 80° to 100°. A maximum braking force on the drive blade is exerted by the substantially perpendicular impingement of the returning propellant on the opposite region of the drive blade.

In a further embodiment, the rotor comprises a second return flow channel, wherein gas inlet and gas outlet openings are arranged between the two return flow channels in orbiting direction in the inner wall relative to the axis of rotation of the turbine wheel, wherein the other cover surface of the turbine housing also has a cross-sectional extension to the second return flow channel in axial direction of the turbine wheel, with the result that two separate eddies are generated, and propellant returning therethrough is in each case deflected from above and below onto the drive blades of the turbine wheel. As a result, the braking effect can be exerted symmetrically on the drive blades, which, on the one hand, increases the braking force, and on the other hand, provides a symmetrical loading of the turbine wheel and thus the mounting.

In a further embodiment, a further opening for guiding through a further component, preferably an optical fibre, is arranged in the inner wall. Further components in addition to propellant supply and propellant removal in the return flow channel or in the preparation instrument can thus be integrated without difficulties, as the arrangement according to the invention of gas inlet and gas outlet opening and the return flow channel leave a sufficiently free space in the inner wall of the turbine housing to provide further channels. As an example, an optical fibre can be guided into the turbine housing to illuminate the implement, The invention also relates to a dental preparation instrument having a rotor according to the invention arranged in a head part which, by means of a propellant supplied by a hand part, drives a preferably exchangeable implement. The rotor is mounted with corresponding mountings in the head part and sealed off from environmental influences. The head part also guides the implement, for example a drill bit or a different dental implement. The dental preparation instrument is guided by the dentist using the hand part. Typically, compressed air is used as propellant. The compressor for generating the compressed air is arranged outside the dental preparation instrument and connected thereto, in a suitable manner, to supply the compressed air. The dental preparation instrument according to the invention thus constitutes a noise-reduced instrument with a long lifespan which also possesses an uncomplicated configuration, is robust and can be produced with small production cost in a compact design.

The invention furthermore relates to a method for operating a dental preparation instrument having a rotor according to the invention arranged in a head part, for driving an implement with a turbine wheel mounted in a turbine housing, wherein the turbine housing is formed from an inner wall radially orbiting the turbine wheel and cover surfaces enclosing the inner wall above and below, comprising the following steps:

- admitting a propellant which is supplied by a hand part via a gas inlet channel through a gas inlet opening into the turbine housing for driving the turbine wheel with a plurality of drive blades;
- reversing the flow at least of one part of the propellant, after impingement on at least one of the drive blades counter to the direction of rotation of the turbine wheel, through a return flow channel to a gas outlet opening, wherein gas inlet opening and gas outlet opening are arranged in the inner wall of the turbine housing within a segment of a circle of a maximum of 1800 and the return flow channel extends at least partially from the gas inlet opening as far as a gas outlet opening in the segment of a circle;
- generating an eddy in the propellant by the turbine housing having, in axial direction, at least one cross-sectional extension of a surface between drive blades and inner wall as far as the return flow channel;
- generating a rotation speed-dependent braking force on the turbine wheel by at least one part of the propellant returning along the return flow channel, which gas is deflected, by the eddy, onto the drive blades, counter to the direction of rotation of the turbine wheel; and
- leading the returning propellant away via the gas outlet opening through at least one gas outlet channel.

The method according to the invention for operating a dental preparation instrument thus constitutes a method with which the dental preparation instrument can be operated in a noise-reduced manner with a long lifespan, while also possessing an uncomplicated configuration, being robust and being able to be produced with small production cost in a compact design.

The above-listed embodiments can be used individually or in any combination with one another to design the device according to the invention and the method according to the invention.

SHORT DESCRIPTION OF THE FIGURES

These and other aspects of the invention are shown in detail in the Figures, as follows.

Figure 1B:
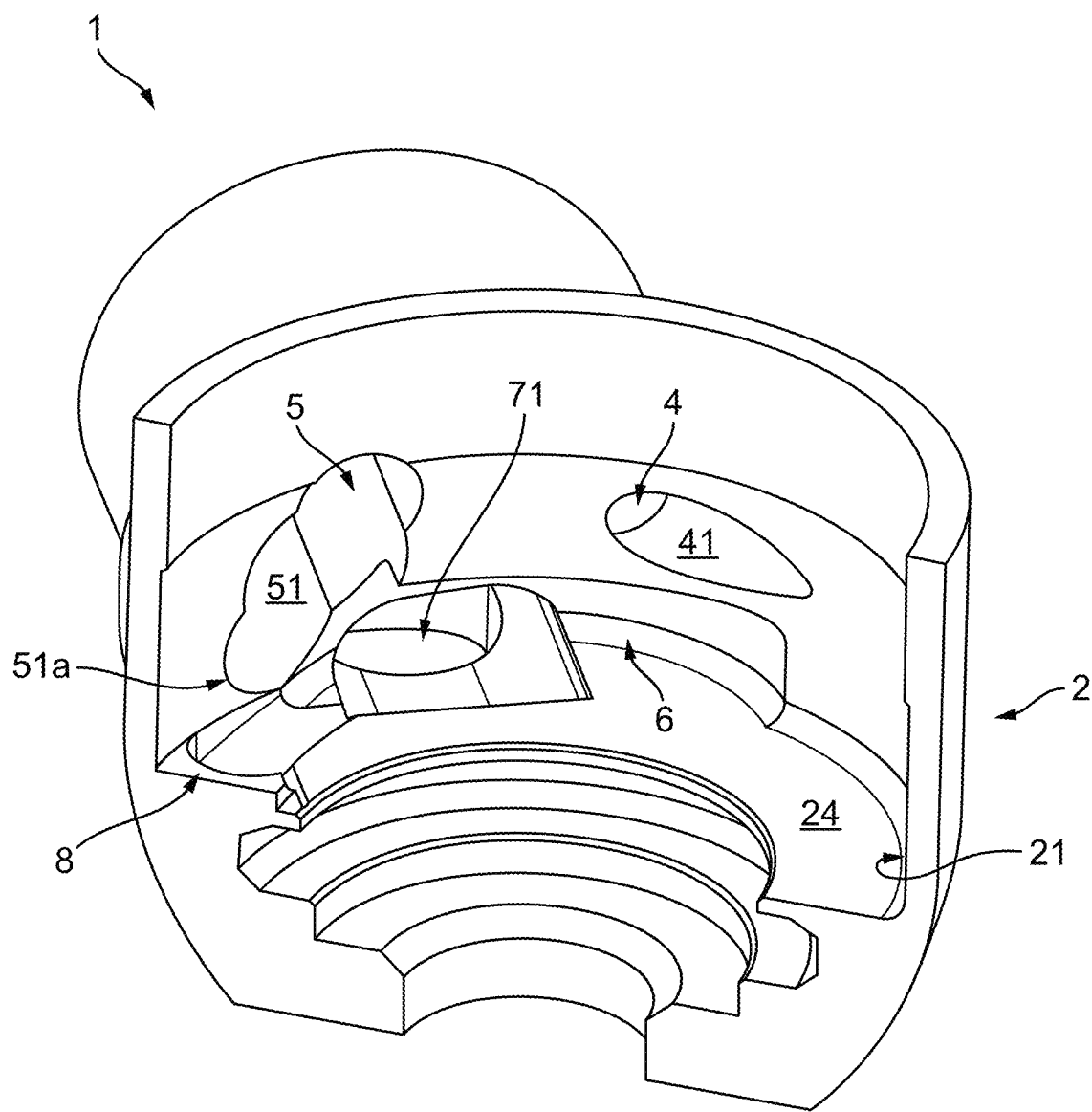
Figure 2:
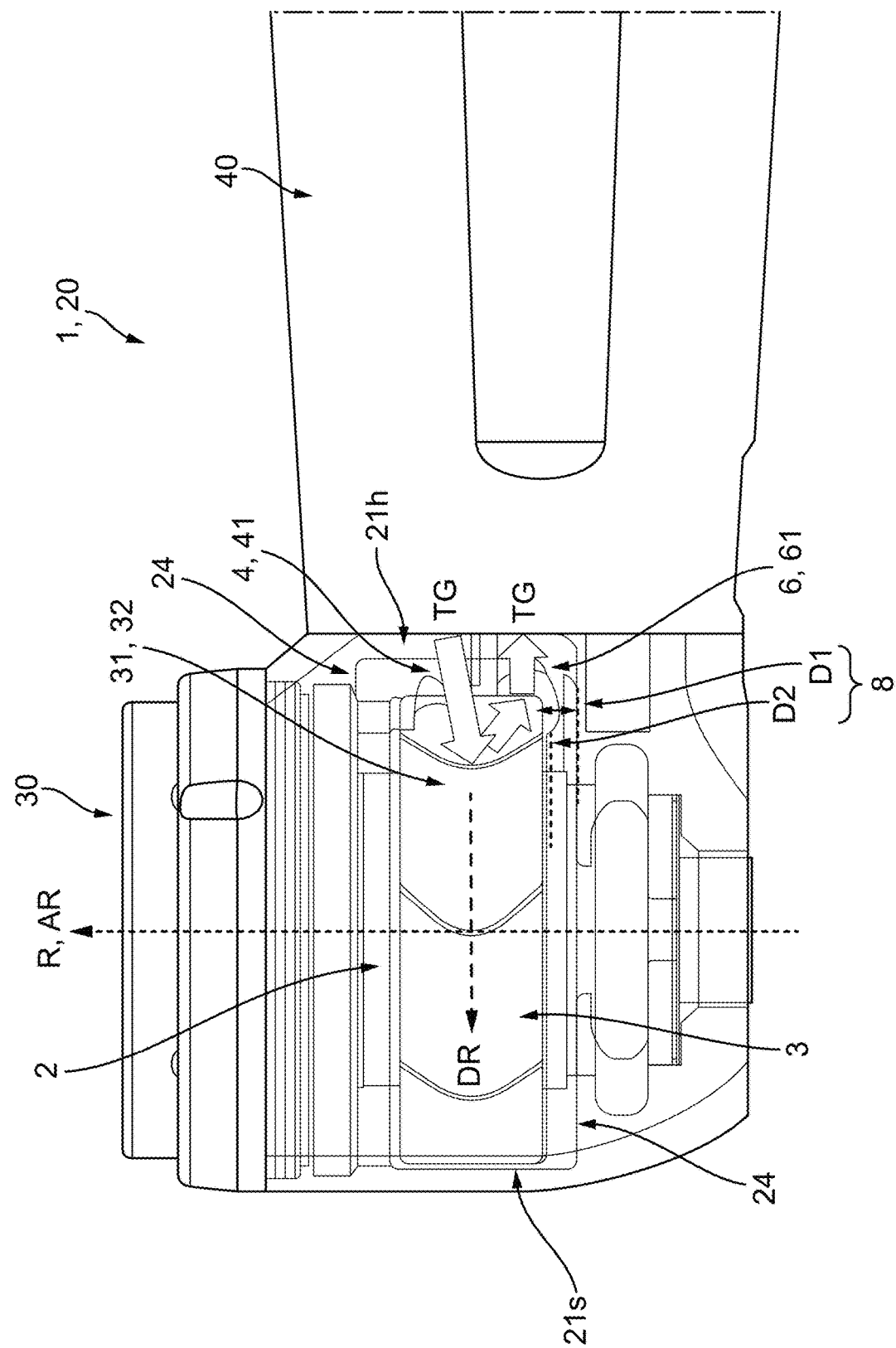
Figure 3:
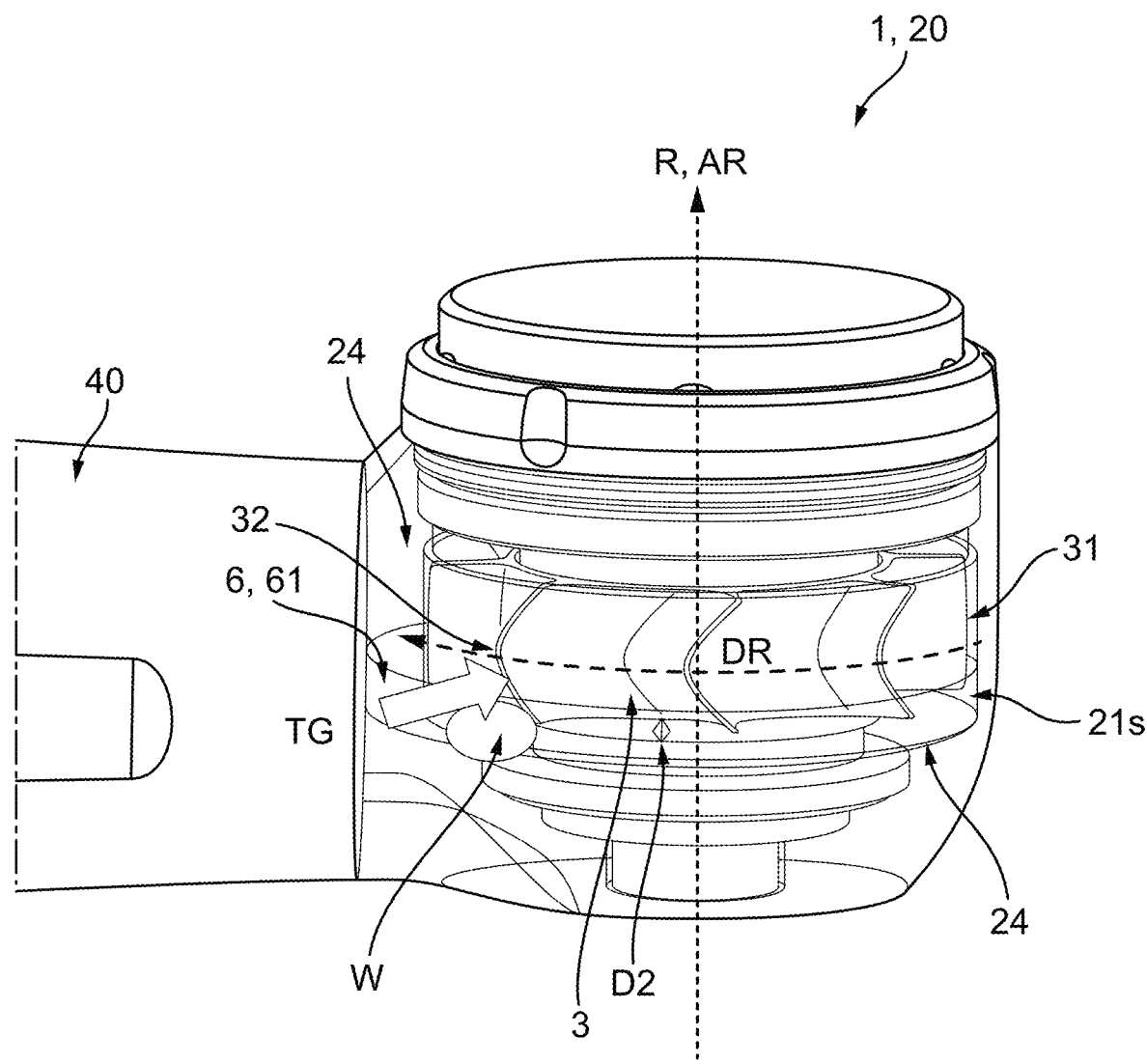
Figure 4:
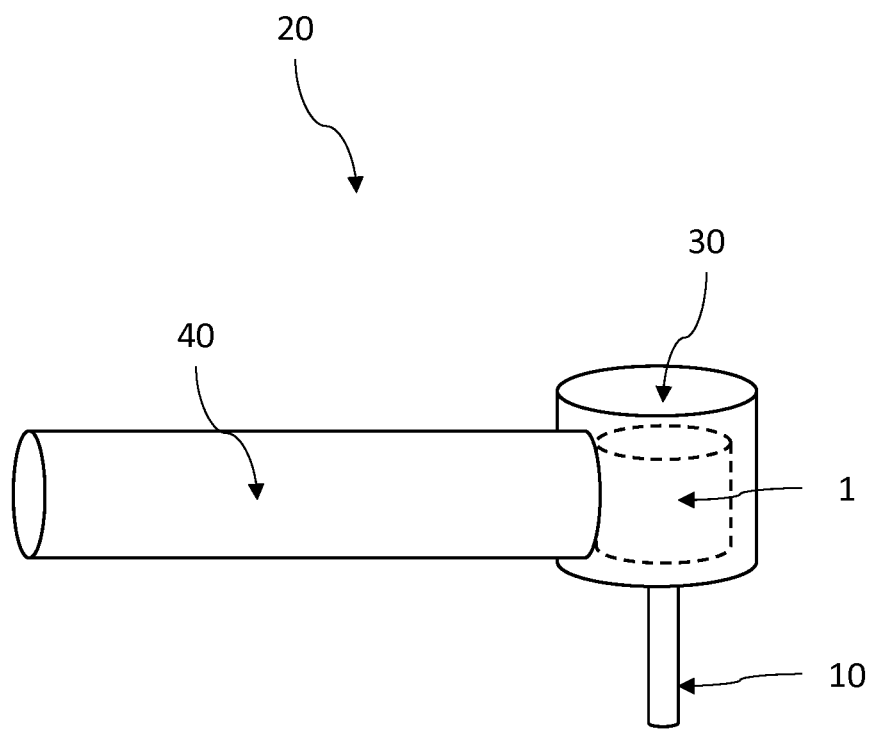

FIG. 1: perspective view of an embodiment of the rotor according to the invention in cut-away view through the inner wall of the turbine housing with (a) only gas inlet and gas outlet openings in the inner wall, and (b) additionally with a further opening in the inner wall;

FIG. 2: lateral section through the turbine housing of an embodiment of the rotor according to the invention or of the dental preparation instrument according to the invention along the axis of rotation of the turbine wheel with schematically represented flow of propellant to drive the turbine wheel;

FIG. 3: lateral section through the turbine housing of an embodiment of the rotor according to the invention or of the dental preparation instrument according to the invention along the axis of rotation of the turbine wheel with schematically represented flow of propellant to slow down the turbine wheel;

FIG. 4: schematic representation of an embodiment of the dental preparation instrument according to the invention.

Figure 5:
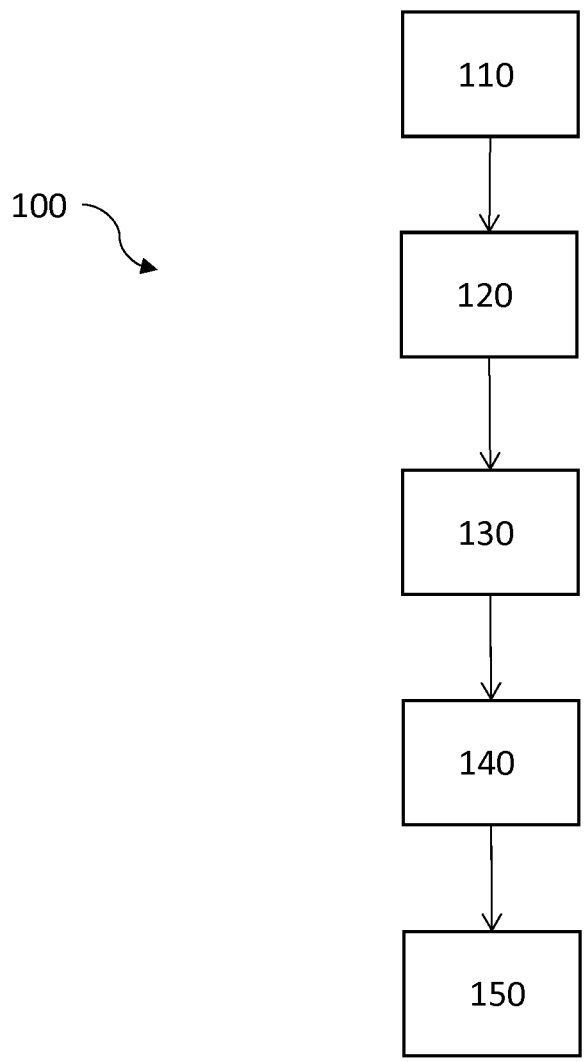

FIG. 5: schematic representation of an embodiment of the method according to the invention for operating the dental preparation instrument.

DETAILED DESCRIPTION OF THE EMBODIMENT EXAMPLES

FIG. 1 shows a perspective view of an embodiment of the rotor 1 according to the invention in cut-away view through the inner wall 21 of the turbine housing 2 with (a) only gas inlet and gas outlet openings 41, 51 in the inner wall 21, and (b) additionally with a further opening 71 in the inner wall 21. The rotor 1 for driving an implement 10 comprises a turbine wheel 3 mounted in a turbine housing 2, which turbine wheel 3 has a plurality of drive blades 31 (see FIGS. 2 and 3), not shown here for the sake of clarity. In so doing, the turbine housing 2 is formed from an inner wall 21 radially orbiting the turbine wheel 3, and cover surfaces 24 enclosing the inner wall 21 above and below, Moreover, the turbine housing 2 comprises at least one gas inlet channel 4 having a gas inlet opening 41 for admitting a propellant TG into the turbine housing 2 for driving the turbine wheel 3 and at least one gas outlet channel 5 having a gas outlet opening 51 for leading the propellant TG away from the turbine housing 2 once the turbine wheel 3 has been driven. Gas inlet opening 41 and gas outlet opening 51 are arranged in the inner wall 21 of the turbine housing 2 within a segment of a circle KS of a maximum of 180°, wherein the orbiting inner wall 21 in the segment of a circle KS comprises at least one return flow channel 6 extending at least from the gas inlet opening 41 as far as the gas outlet opening 51. Each of the outer ends denotes the side of the respective opening which lies on the end facing away from the adjacent opening. In so doing, the return flow channel 6 is designed such that at least one part of the propellant TG flows back to the gas outlet opening 51 through the return flow channel 6 after impinging on at least one of the drive blades 31 counter to the direction of rotation DR of the turbine wheel 3 (see on this point FIGS. 2 and 3), wherein, in axial direction AR, the lower cover surfaces 24 of the turbine housing 2 have a cross-sectional extension 8 to the return flow channel 6. The cross-sectional extension 8 is formed by a recess in the lower cover surfaces 24, having a first distance D1 in axial direction AR between drive blades 31 and the cover surface 24 which extends at least over the region 22 of the return flow channel 6 viewed in direction of the propellant TG flowing in return flow channel 6, at least as far as the outer end of the gas outlet opening 51 in direction of the returning propellant TG, and having at least one second distance D2 in axial direction AR between drive blades 31 and the cover surface 24 in the other region 23, wherein the second distance D2 is less than the first distance D1. The second distance can also be nearly zero. Here, the cross-sectional extension 8 is arranged in direction of rotation DR of the turbine wheel 3 shortly in front of the gas outlet opening 51, wherein the angle Q stretched between cross-sectional extension 8, axis of rotation R of the turbine wheel 3 and outer end 51a of the gas outlet opening 51 is preferably only a few degrees, preferably less than 5°, or 0°. In this close arrangement of the cross-sectional extension 8 in the gas outlet opening 51, the eddy W generated by the cross-sectional extension 8 is directly against or at the gas outlet opening 51.

Here, the return flow channel 6 orbits the turbine wheel 3 at the same axial height relative to the axis of rotation R of the turbine wheel 3, below the gas inlet and gas outlet openings 41, 51. Viewed in direction of the axis of rotation R of the turbine wheel 3, the gas inlet opening 41 and the gas outlet opening 51 are thus both arranged above the return flow channel 6. The return flow channel 6 is guided in the orbiting inner wall 21 of the turbine housing 2 with a cross-sectional surface 61 in radial direction of the turbine wheel 3 such that at least the geometric focal point of the cross-sectional surface 61 lies further away from the turbine wheel 3 in radial direction RR than the gas inlet opening 41 and the gas outlet opening 51. Here, additionally, the gas inlet and gas outlet openings 41, 51 each possess centres (geometric focal points) which are arranged at the same axial height relative to the axis of rotation R of the turbine wheel 3. In one embodiment, the cross-sectional extension 8 extends to below the turbine wheel 3. Moreover, the cover surface 21 passes from the first distance D1 to the second distance D2 to the turbine wheel 3 in a curved contour, at least in the region of the gas outlet opening 51. This can also be the case in the region of the gas inlet opening 41. In a further embodiment not shown here, the turbine housing 2 can comprise an additional second return flow channel 6, wherein gas inlet and gas outlet openings 41, 51 are arranged between the two return flow channels 6 in axial direction AR in the inner wall 21 relative to the axis of rotation R of the turbine wheel 3, with the result that two separate eddies W are generated, and propellant TG returning therethrough is in each case deflected from above and below onto the drive blades 31 of the turbine wheel 3. In the embodiment in FIG. 1b, a further opening 71 for guiding through a further component, preferably an optical fibre, is additionally arranged in the inner wall 21 between gas inlet and gas outlet opening 41, 51.

FIG. 2 shows a lateral section through the turbine housing 2 of an embodiment of the rotor 1 according to the invention or of the dental preparation instrument 20 according to the invention along the axis of rotation R of the turbine wheel 3 with schematically represented flow of propellant TG for driving the turbine wheel 3. In addition to the rotor 1, a part of the hand part 40, connected thereto, of the dental preparation instrument 20 is shown. Here, gas outlet opening 51 (not explicitly shown) and return flow channel 6 are aligned towards one another such and a contour of the drive blades 31 is formed such that the propellant TG is deflected approximately by approximately 130° in its propagation direction by the impingement on the drive blades 31 in direction of rotation DR of the turbine wheel 3 with axis of rotation R. The gas inlet channel 4 is shaped as a nozzle in the region of the gas inlet opening 41, which nozzle forces the propellant onto the drive blades 31 in a directed manner. The nozzle generates a flow of propellant directed downwards in a direction which is at an angle to the axis of rotation R of the turbine wheel 3 with respect to a horizontal gas inlet or a parallel gas inlet relative to the rotation plane, in order that the propellant TG flowing in is not disrupted by the propellant TG flowing back, as is indicated by the white arrow TG. The returning propellant TG then flows parallel to the cover surface 24 along the cover surface 24 of the turbine housing 2, which leads to the flow direction along the third arrow TG. Here, the return flow channel 6 is guided in the orbiting inner wall 21 of the turbine housing 2 with a cross-sectional surface 61 in radial direction RR of the turbine wheel 3 such that the whole return flow channel 6 lies further away from the turbine wheel 3 in radial direction RR than at least the gas outlet opening 51. The cross-sectional surface 61 is underneath the gas inlet opening 41 and the gas inlet channel 4 located therebehind respectively, and also below the turbine wheel 3 through the recess of the lower cover surface 24. The end face 21s and the hand side 21h of the turbine housing 2 are shown here explicitly for illustrative purposes. The cross-sectional extension 8 (here shown in lateral section in a top view) is formed by a recess in the lower cover surface 24, where the cover surface 24 recoils from a second distance D2 in axial direction AR between drive blades 31 and cover surface 24 to a first distance D1 in axial direction AR between drive blades 31 and cover surface 24, wherein the second distance D2 is shorter than the first distance D1.

FIG. 3 shows a lateral section through the turbine housing 2 of an embodiment of the rotor 1 according to the invention or of the dental preparation instrument 20 according to the invention along the axis of rotation R of the turbine wheel 3 with schematically represented flow of propellant TG to slow down the turbine wheel 3. Additionally to the rotor 1, a part of the hand part 40, connected thereto, of the dental preparation instrument 20 is shown. Viewed in radial direction RR, the drive blades 31 possess a wavy contour, at least on the front side viewed in direction of rotation DR, wherein both regions (sides) 32 point the contour backwards in direction of rotation of the turbine wheel 3. Here, the ratio between first and second distance D1, D2 is chosen such that the eddy W (shown schematically by the white circle) being produced at the cross-sectional extension 8 of the recoiling cover surface 24 is set in terms of size such that this deflects the propellant TG returning through the return flow channel 6 against the region 32 of the drive blade 31 (here the lower region or side) facing the eddy W. Here, the region 32 facing the eddy W is aligned such that the returning propellant TG (schematically shown by the white arrow) strikes the region 32 at an angle of 80° to 100°. The cover surfaces 24 of the turbine housing 2 are located above and below the drive blades 31. The end face 21s of the turbine housing 2 is located on the right-hand side. In a further embodiment (here not shown explicitly), the turbine housing 2 of the rotor 1 comprises a second return flow channel, wherein gas inlet and gas outlet openings 41, 51 are arranged between the two return flow channels 6 in axial direction AR in the inner wall 21 relative to the axis of rotation R of the turbine wheel 3, wherein the other cover surface 24 of the turbine housing 2 also has a cross-sectional extension to the second return flow channel 6 in axial direction AR of the turbine wheel 2, with the result that two separate eddies W (eddy W shown in the vicinity of the lower cover surface 24 of the turbine wheel 2 and additional eddy W in the vicinity of the upper cover surface 24 of the turbine wheel 2, not shown here) are generated, and propellant TG returning therethrough is in each case deflected from above and below onto the drive blades 31 of the turbine wheel 3.

FIG. 4 shows a schematic representation of an embodiment of the dental preparation instrument 20 according to the invention having a rotor 1 according to the invention arranged in a head part 30, which drives a preferably exchangeable implement 10 by means of a propellant TG supplied by a hand part 40. The gas inlet and gas outlet channels are not shown in detail here. Additionally, the dental preparation instrument 20 can comprise one or more further channels which are guided into the turbine housing by means of at least one further opening 71 (see FIG. 1b).

The additional channel can for example accommodate an optical fibre which is conchanneled through the further opening 71 into the turbine housing.

FIG. 5 shows a schematic representation of an embodiment of the method 100 according to the invention for operating a dental preparation instrument 20 having a rotor 1 according to the invention arranged in a head part 30, for driving an implement 10 with a turbine wheel 3 mounted in a turbine housing 2, wherein the turbine housing 2 is formed from an inner wall 21 radially orbiting the turbine wheel 3 and cover surfaces 24 enclosing the inner wall 21 above and below, comprising the following steps of admitting 110 a propellant TG which is supplied by a hand part 40 via a gas inlet channel 4 through a gas inlet opening 41 into the turbine housing 2 for driving the turbine wheel 3 with a plurality of drive blades 31; reversing the flow 120 at least of one part of the propellant TG, after impingement on at least one of the drive blades 31 counter to the direction of rotation DR of the turbine wheel 3, through a return flow channel 6 to a gas outlet opening 51, wherein gas inlet opening 41 and gas outlet opening 51 are arranged in the inner wall 21 of the turbine housing 2 within a segment of a circle KS of a maximum of 180° and the return flow channel 6 extends at least partially from the gas inlet opening 41 as far as a gas outlet opening 51 in the segment of a circle KS; generating 130 an eddy W in the propellant TG by the turbine housing 2 having, in axial direction AR, at least one cross-sectional extension 8 of a surface between drive blades 31 and inner wall 21 as far as the return flow channel 6; generating 140 a rotation speed-dependent braking force on the turbine wheel 3 by at least one part of the propellant TG returning along the return flow channel 6, which gas is deflected, by the eddy W, onto the drive blades 31, counter to the direction of rotation DR of the turbine wheel 3; and leading 150 the returning propellant TG away through at least one gas outlet channel 5 via the gas outlet opening 51.

The embodiments shown here constitute only examples of the present invention, and therefore must not be understood as being restrictive. Alternative embodiments taken into consideration by a person skilled in the art are likewise covered by the scope of protection of the present invention.

LIST OF REFERENCE NUMERALS

1 Rotor according to the invention
2 Turbine housing
21 Inner wall of the turbine head
21h Hand side of the inner wall
21s End face of the inner wall
22 Region with first distance between turbine wheel and cover surface
23 Region with second distance between turbine wheel and cover surface
24 Cover surface (upper and lower)
3 Turbine wheel
31 Drive blades
32 Region of the drive blade, struck by the returning propellant
4 Gas inlet channel
41 Gas inlet opening
5 Gas outlet channel
51 Gas outlet opening
51a Outer end of the gas outlet opening viewed in direction of the returning propellant
6 Return flow channel
61 Cross-sectional surface of the return flow channel in radial direction
71 Further opening in the inner wall of the turbine housing
8 Cross-sectional extension
10 Implement
20 Dental preparation instrument according to the invention
30 Head part of the preparation instrument
40 Hand part of the preparation instrument
100 Method according to the invention
110 Admission of the propellant in the turbine housing, for driving the turbine wheel
120 Reversing the flow at least of one part of the propellant counter to the direction of rotation of the turbine wheel through the return flow channel to the gas outlet opening
130 Generating an eddy in the propellant by a cross-sectional extension of a surface between drive blades in axial direction
140 Generating a rotation speed-dependent braking force on the turbine wheel by the returning propellant deflected onto the drive blades by the eddy
150 Leading the returning propellant away via the gas outlet opening
AR Axial direction, parallel to the axis of rotation of the turbine wheel
D1 First distance between inner wall and turbine wheel
D2 Second distance between inner wall and turbine wheel
DR Direction of rotation of the turbine wheel
KS Segment of a circle in which the return flow channel lies
Q Angle between cross-sectional extension, axis of rotation of the turbine wheel and end of the gas outlet opening, viewed in the direction of the returning propellant.
R Axis of rotation of the turbine wheel
RR Radial direction viewed from the axis of rotation of the turbine wheel
TG Propellant
W Eddy

The invention claimed is:

1. A rotor for driving an implement of a dental preparation instrument, having
a turbine wheel mounted in a turbine housing of the dental preparation instrument, which turbine wheel has a plurality of drive blades,
wherein the turbine housing is formed from an inner wall radially orbiting the turbine wheel, and cover surfaces enclosing the inner wall above and below,
at least one gas inlet channel with a gas inlet opening for admitting a propellant into the turbine housing for driving the turbine wheel and
at least one gas outlet channel with a gas outlet opening for leading the propellant away from the turbine housing once the turbine wheel has been driven,
wherein the gas inlet opening and the gas outlet opening are arranged in the inner wall within a segment of a circle of a maximum of 180°,
wherein the inner wall in the segment of the circle comprises at least one return flow channel extending at least partially from the gas inlet opening as far as the gas outlet opening,
wherein the return flow channel allows at least one part of the propellant to flow back to the gas outlet opening through the return flow channel after impinging on at least one of the drive blades counter to the direction of rotation of the turbine wheel, and wherein, in the axial direction, the turbine housing has at least one cross-sectional extension between the drive blades and one of the cover surfaces, which is formed by a recess in one of the cover surfaces, with a first distance in the axial direction between the drive blades and the cover surface, which extends at least over a first region of the return flow channel viewed in the direction of the propellant flowing in the return flow channel at least as far as an outer end of the gas outlet opening in the direction of the returning propellant, and with at least one second distance in the axial direction between the drive blades and the cover surface in a region of the return flow channel different from the first region, wherein the second distance is shorter than the first distance.

2. The rotor according to claim 1, characterized in that the return flow channel orbits the turbine wheel at the same axial height relative to the axis of rotation of the turbine wheel.

3. The rotor according to claim 1, characterized in that the gas inlet opening and/or the gas outlet opening are arranged, relative to the return flow channel, above or below one another, viewed in the direction of the axis of rotation of the turbine wheel.

4. The rotor according to claim 3, characterized in that the return flow channel is guided in the inner wall of the turbine housing with a cross-sectional surface parallel to the radial direction of the turbine wheel such that at least the centre of the cross-sectional surface lies further away from the turbine wheel in a radial direction than the gas inlet opening and/or the gas outlet opening.

5. The rotor according to claim 1, characterized in that the cross-sectional extension extends to below the turbine wheel.

6. The rotor according to claim 2, characterized in that the gas inlet and gas outlet openings each possesses centres which are arranged at the same axial height relative to the axis of rotation of the turbine wheel.

7. The rotor according to claim 1, characterized in that the segment of a circle with gas inlet and gas outlet openings is arrangeable on one hand side of the dental preparation instrument.

8. The rotor according to claim 1, characterized in that a contour of the drive blades is formed such that the propellant is deflected in its propagation direction by 90° to 175°.

9. The rotor according to claim 1, characterized in that the cover surface passes from the first distance to the second distance to the turbine wheel in a curved contour.

10. The rotor according to claim 1, characterized in that the gas inlet channel is shaped as a nozzle at least in the region of the gas inlet opening, in order to steer the propellant onto the drive blades in a directed manner.

11. The rotor according to any one of the preceding claims, characterized in that a ratio between the first and second distances forces an eddy which redirects the propellant returning through the return flow channel against a region of the drive blade facing the eddy, at least the region facing the eddy has an alignment which causes the returning propellant to strike the region at an angle of 80° to 100°.

12. The rotor according to claim 1, characterized by a second return flow channel, wherein the gas inlet and gas outlet openings are arranged between the two return flow channels in orbiting direction in the inner wall relative to the axis of rotation of the turbine wheel, wherein the other cover surface of the turbine housing also has, same as said at least one cross-sectional extension, another cross-sectional extension, formed by a recess therein, with the result that two separate eddies are generated, and propellant returning therethrough is in each case deflected from above and below onto the drive blades of the turbine wheel.

13. The rotor according to claim 1, characterized in that at least one further opening for guiding through a further component is arranged in the inner wall.

14. A dental preparation instrument having a rotor according to claim 1 arranged in a head part, which, by means of a propellant supplied by a hand part, drives an implement.

15. A method for operating a dental preparation instrument having a rotor arranged in a head part, for driving an implement with a turbine wheel mounted in a turbine housing, wherein the turbine housing is formed from an inner wall radially orbiting the turbine wheel and cover surfaces enclosing the inner wall above and below, comprising the following steps: admitting a propellant which is supplied by a hand part via a gas inlet channel through a gas inlet opening into the turbine housing for driving the turbine wheel with a plurality of drive blades; reversing the flow at least of one part of the propellant, after impingement on at least one of the drive blades counter to the direction of rotation of the turbine wheel, through a return flow channel to a gas outlet opening, wherein the gas inlet opening and the gas outlet opening are arranged in the inner wall of the turbine housing within a segment of a circle of a maximum of 180° and the return flow channel extends at least partially from the gas inlet opening as far as a gas outlet opening in the segment of a circle; generating an eddy in the propellant by the turbine housing having, in an axial direction, at least one cross-sectional extension of a surface between the drive blades and one of the cover surfaces;

generating a rotation speed-dependent braking force on the turbine wheel by at least one part of the propellant returning along the return flow channel, which gas is deflected, by the eddy, onto the drive blades, counter to the direction of rotation of the turbine wheel; and leading the returning propellant away via the gas outlet opening through at least one gas outlet channel.

* * * * *